United States Patent [19]

Hiyama et al.

[11] Patent Number: 5,337,514
[45] Date of Patent: Aug. 16, 1994

[54] METHOD AND APPARATUS FOR PLANT CULTURE

[76] Inventors: Kazuo Hiyama, 8184 E. Adams Ave.; Howard K. Hiyama, 8140 E. Adams Ave.; Dean H. Hiyama, 431 E. Curtis Ave., all of Fowler, Calif. 93625

[21] Appl. No.: 890,848

[22] Filed: Jun. 1, 1992

Related U.S. Application Data

[62] Division of Ser. No. 442,733, Nov. 29, 1989, Pat. No. 5,144,768.

[51] Int. Cl.$^5$ .............................................. A01G 17/06
[52] U.S. Cl. ............................................. 47/44; 47/46; 47/47
[58] Field of Search ................................ 47/44, 46, 47

[56] References Cited

U.S. PATENT DOCUMENTS

| | | | |
|---|---|---|---|
| 542,821 | 7/1895 | Broughton et al. | 47/44 |
| 941,894 | 11/1909 | Stetson | 47/46 |
| 3,469,343 | 9/1969 | Johnson et al. | 47/46 |
| 3,526,993 | 9/1970 | Siebol | 47/46 |
| 4,023,307 | 5/1977 | Clark et al. | 47/46 |
| 4,270,581 | 6/1981 | Claxton et al. | 47/46 |
| 4,625,454 | 12/1986 | Daniell | 47/44 |
| 4,738,051 | 4/1988 | Dyson | 47/46 |

*Primary Examiner*—Ramon S. Britts
*Assistant Examiner*—Joanne C. Downs
*Attorney, Agent, or Firm*—Worrel & Worrel

[57] ABSTRACT

A method for plant culture including the steps of growing plants, which produce elongated flexible portions, in supported relation on a structure; permitting the flexible portions to grow; and moving the flexible portions substantially into predetermined positions relative to the plants for subsequent plant cultural practices. An apparatus comprising a frame adapted to be disposed adjacent to the plants and having a laterally projecting portion; and a mechanism for moving the flexible portions of the plants into positions overlaying the support portion of the frame extending laterally of the plants.

9 Claims, 4 Drawing Sheets

METHOD AND APPARATUS FOR PLANT CULTURE

BACKGROUND OF THE INVENTION

This is a divisional of copending application(s) Ser. No. 07/442,733 filed on Nov. 29, 1989, now U.S. Pat. No. 5,144,768.

1. Field of the Invention

The present invention relates to a method and apparatus for plant culture and more particularly to such a method and apparatus which are adapted to training the growth of plants in such a fashion as to facilitate the maintenance and productivity thereof by segregating the areas of growth, all in a manner which minimizes the amount of manual labor required to accomplish the foregoing while concomitantly making possible substantially the full automation of such care.

2. Description of the Prior Art

Operations associated with the raising of field crops are dependent upon a multiplicity of factors inherent in the nature of the crop, the growth patterns of the plants, the susceptibility of the plants to parasites and disease, and, more generally, the horticultural practices required in producing the desired results. It has long been known, for example, that the natural growth patterns of the plants may interfere with the performance of some or all of these operations. The training of plants in an effort to minimize or overcome these difficulties is a necessity in modern farming operations.

For example, the successful commercial production of grapes and raisins has long been dependent upon the training of the grapevines on trellis structures to support the grapevines not only for harvesting of the crop therefrom, but also for those horticultural practices required in a successful commercial operation. Left without support, grapevines of all varieties would trail on the ground in such a fashion as to make commercial production completely impossible. Therefore, grapevines are typically grown in rows supported on trellis structures which retain the trunks in upright attitudes so that the crop is, in large part, retained out of ground engagement; so that the canes can be pruned after harvest to prepare the vines for the next growing season; so that the grapevines can be sprayed with insecticide and fertilized as necessary; and so that the grapevines can otherwise be cared for in a manner consistent with the current state of technology.

Notwithstanding the foregoing, farming is still plagued by chronic difficulties incident to these considerations. The increase in the cost of manual labor has caused commercial farming operations to rely more heavily on mechanization. However, many of the foregoing considerations have prevented full mechanization as a means of maintaining the cost of such commercial operations within manageable proportions. Thus, for example, in the case of the commercial production of grapes and raisins, the natural growth patterns of the grapevines are in many cases directly in conflict with those procedures which must be performed in any such commercial operations. Thus, it is known that the canes of the grapevine which produce the crop do so substantially only in the second season of growth. Thus, the canes grow in a first season and those same canes produce the crop in the second season. Conversely, once the fruiting canes have produced a crop, they are no longer as productive and proper horticultural practice calls for those canes, once the crop has been harvested, to be pruned from the grapevine to make room for the growth of new or renewal canes. Unfortunately, the canes naturally grow in a haphazard, random manner which makes it exceedingly difficult to distinguish a first year's growth from a second year's growth. Accordingly, a chronic problem resides in the fact that unskilled laborers frequently prune canes which should be left for the next season's production and mistakenly avoid pruning canes which should be removed to make way for new cane growth in the subsequent season. This not only reduces production in the following years, but is also exceedingly expensive.

Similarly, the random growth pattern of grapevines, even when supported on conventional trellis structures, results in the canes, foliage and crop being so intermixed as to interfere with such operations as harvesting, spraying, pruning, and the like. Similarly, the foliage and canes typically enclose the crop in such a manner that moisture produced by inclement weather is largely entrapped, thereby damaging the crop. Even during clear weather, the desired direct exposure of the crop to sunlight is reduced by the foliage of the grapevines.

Still another example can be found in the vine drying of grapes to form raisins. It has been known to dry grapes on the vine to form raisins in order to avoid the more common process of laying the grapes on trays on the ground for drying. The conventional vine drying of grapes to form raisins calls for the grapes to be sprayed with a substance, such as methyl oleate, to remove the protective coating from the grapes and to sever the canes at a particular time to enhance the dehydration process. However, due to the entanglement of the fruiting canes with the renewal canes, it is extremely difficult for field workers to distinguish between the canes. Furthermore, the encapsulating foliage interferes with spraying of the grapes and exposure to sunlight. Accordingly, such conventional vine drying methods have proved less than satisfactory.

Therefore, it has long been known that it would be desirable to have a method and apparatus for plant culture which is capable of training plants in such a fashion as to be fully compatible with the horticultural practices required, which substantially the full automation of such farming operations, farming operations can operate, which makes possible substantially the full automation of such farming operations, which has particular utility in the commercial production of grapes and raisins, and which is otherwise fully dependable in achieving the most economic and productive farming operations.

SUMMARY OF THE INVENTION

Therefore, it is an object of the present invention to provide an improved method and apparatus for plant culture.

Another object is to provide such a method and apparatus which are fully compatible with all of the horticultural practices required of a successful commercial farming operation and which, in addition, so control the growth of the plants trained thereby to position the portions thereof for the most efficient and effective performance of each step in the process.

Another object is to provide such a method and apparatus which have particular utility in the commercial production of grapes and raisins.

Another object is to provide such a method and apparatus which are capable of segregating the various portions of the plants into growth zones for the subsequent performance of the various horticultural practices required.

Another object is to provide such a method and apparatus which reduce to an absolute minimum the manual labor required in such a commercial farming operation while so arranging the plants as to make possible a substantially fully automated farming operation.

Another object is to provide such a method and apparatus which are fully compatible with present commercial farming operations permitting them to be introduced to an existing farming operation without a radical change in existing procedures.

Another object is to provide such a method and apparatus which, when applied to the farming of grapevines, permit the first year, or renewal canes, to be segregated from the second year, or fruiting canes, thereby permitting the fruiting canes to be pruned from the grapevines after harvest without in any way risking damage to the renewal canes.

Further objects and advantages are to provide improved elements and arrangements thereof in an apparatus for the purposes described which is dependable, economical, durable and fully effective in accomplishing its intended purposes.

These and other objects and advantages are achieved, in the preferred embodiment of the method of the present invention, by providing for the steps of growing plants, which produce elongated, flexible portions, in supported relation on a structure; permitting the flexible portions to grow; and moving the flexible portions substantially into predetermined positions relative to the plants on a seasonally discriminate basis for subsequent plant cultural practices.

DESCRIPTION OF THE PREFERRED EMBODIMENT

Figure 1:
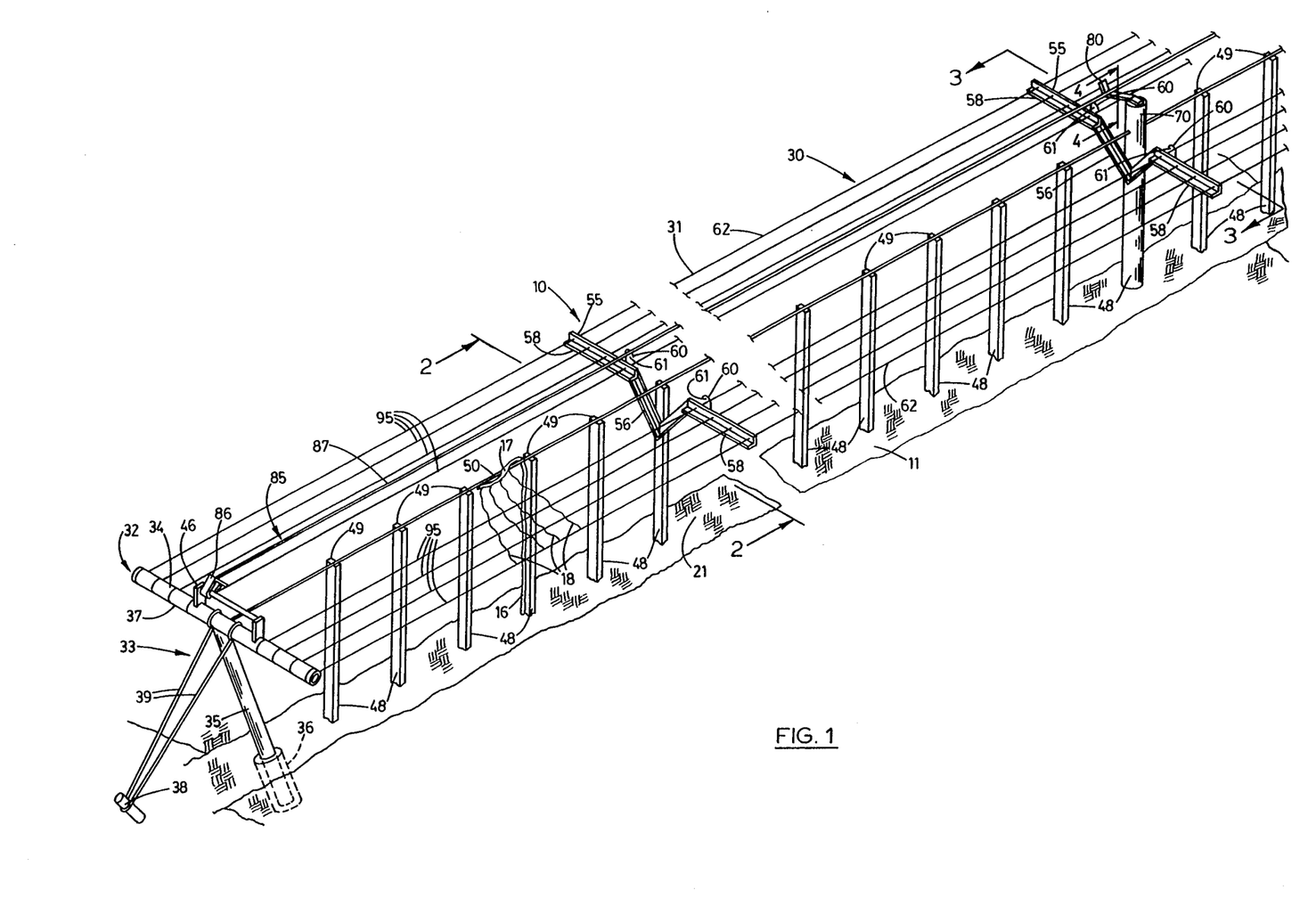
FIG. 1 is a fragmentary, perspective view of the apparatus of the present invention shown in a typical operative environment deployed for the practice of the method of the present invention and showing a single grapevine supported therein for illustrative convenience.
Figure 2:
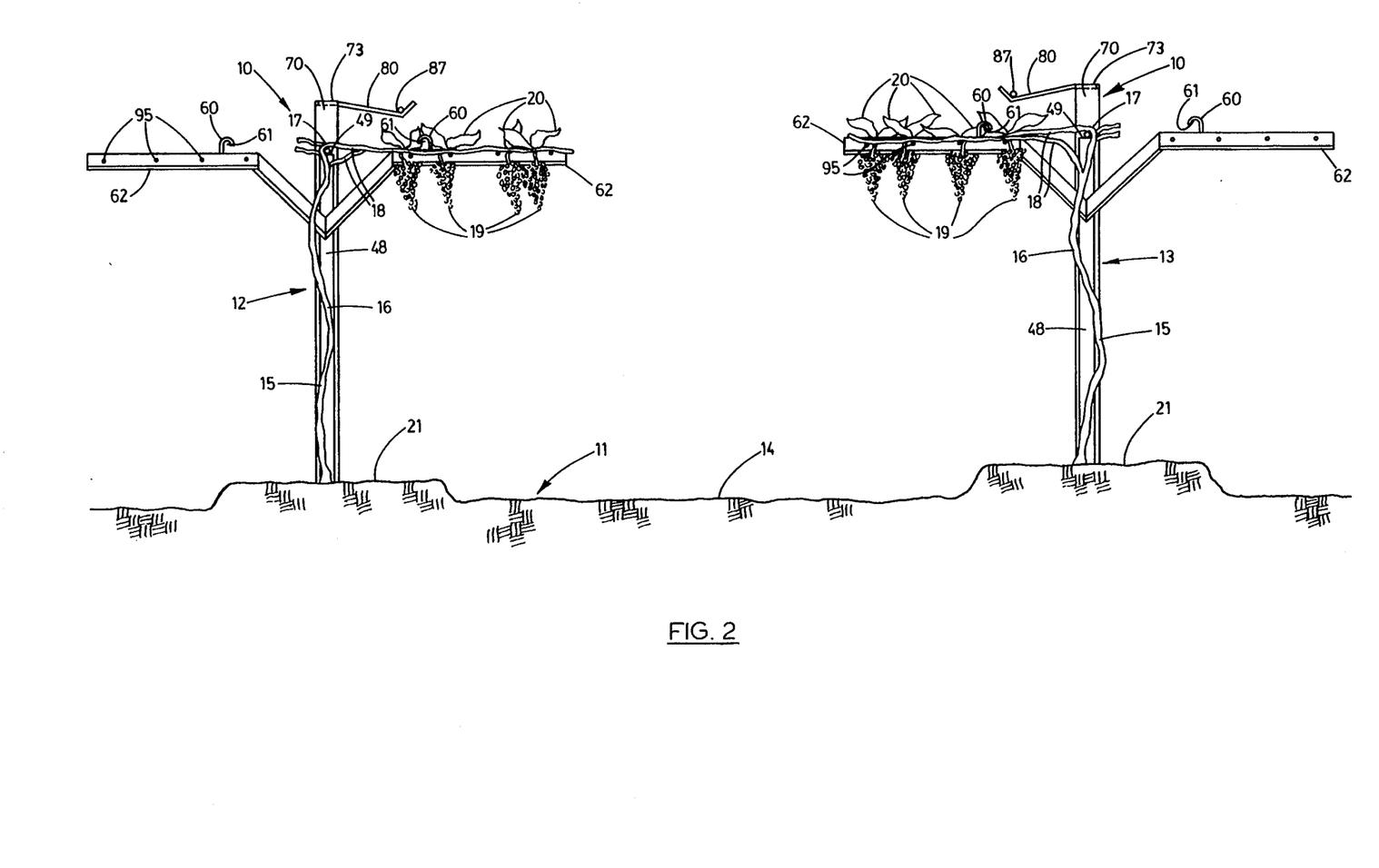
FIG. 2 is a somewhat enlarged, transverse vertical section taken from the position indicated by line 2—2 in FIG. 1 and additionally showing a second row of grapevines within which a second apparatus of the present invention has been installed.

Referring more particularly to the drawings, the apparatus for plant culture of the present invention is generally indicated by the numeral 10 in FIG. 1. As shown in FIGS. 1 and 2, the earth's surface is indicated at 11. As will subsequently become more clearly apparent, the method and apparatus of the present invention have application to a wide variety of plants. For illustrative convenience, however, they are shown and described herein in regard to grapevines. Thus, referring more particularly to FIG. 2, a first row of grapevines is indicated at 12 on the left therein and a second row of grapevines is indicated at 13 on the right. The rows of grapevines are separated by a path 14 along which vehicles and field workers would normally pass in caring for the grapevines. It will be understood that the rows of grapevines 12 and 13 are a portion of a vineyard consisting of a multiplicity of similar substantially parallel rows of grapevines.

Each row of grapevines 12 and 13 is comprised of a plurality of plants or grapevines 15 planted in the earth in predetermined spaced relation. Each grapevine has a trunk 16 which, as will be described, is supported by the apparatus 10. Each grapevine is trained to have a cordon 17 at the upper end thereof extending laterally of the trunk and from which flexible portions, or canes 18 grow. It is the canes which produce the crop, in this case bunches of grapes 19, and foliage 20. Each grapevine is planted, in the conventional fashion, in a berm 21 which is simply a mounded portion of earth within which and along which the grapevines are planted.

It will be understood that the planting of the grapevines 15 in substantially parallel rows, the training of grapevines in supported relation on stakes and the normal horticultural growth pattern heretofore described of grapevines is, of course, entirely conventional. However, the method and apparatus of the present invention hereinafter described, is novel. As previously described, the method and apparatus of the present invention, while having particular utility in the training and care of grapevines, have application to a wide variety of types of plants.

For purposes of illustrative convenience, only one grapevine is shown in FIG. 1. It is to be understood, however, that the grapevines are planted and trained in a manner consistent with the method and apparatus of the present invention hereinafter to be described.

The apparatus 10 has a frame or trellis structure 30 which extends the entire length of each row of grapevines and, in the preferred embodiment, is comprised of sub-assemblies which are preferably repeated in sections 31 of the apparatus. The portion of the apparatus 10 shown fragmentarily in FIG. 1 is one such section 31 which, in a single row, may possess ten or more such sections extending continuously throughout the length of the row. The number of sections employed is dependent substantially only on the length of the row.

As shown in FIG. 1, the end of the trellis structure 30 is indicated at 32. The trellis structure at this point has a high tension support structure 33 including a T-frame 34. The T-frame has an upright member 35, which is preferably a steel pipe, mounted in the berm 21 within a concrete foundation 36. The upright member is preferably canted at an angle, as shown in FIG. 1, to true vertical so that it extends upwardly and toward the left, as viewed in FIG. 1. A cross member 37, also preferably a steel pipe, is mounted, as by welding, on the upright member 35 in a substantially horizontal attitude substantially normal to the upright member and to the row. A piling 38 is mounted in the berm 21, using concrete if desired, endwardly of the end trellis structure 32. High tension retention wires 39 interconnect the piling 38 and the cross member 37 to assist in retaining the T-frame 34 in the attitude described.

There is, of course, a high tension support structure 33 at the opposite end of the row mounted in the earth in the manner heretofore described, but with the T-frame 34 thereof mounted so as to be canted in the opposite direction for the same purpose.

A control wire mounting assembly 45 is mounted on the cross members 37 of the T-frames 34 at the opposite ends of the row. Each mounting assembly consists of a pair of brackets 46 mounted by welding on the upper surface of the cross member 37 in spaced relation. The brackets are interconnected by a rod 47 extending therebetween.

The trellis structure 30 includes a multiplicity of upright members or stakes 48 mounted in the berm 21 in predetermined spaced relation to each other extending throughout the length of the row. The stakes may be constructed of wood or metal and have upper ends 49 which are aligned longitudinally of the row at the same elevation. A central member or pivot wire 50 is mounted on and interconnects the cross members 37 of the T-frames 34 at the opposite ends of the row extending therebetween and across the upper ends 49 of the stakes 48. The upper ends 49 of the stakes are preferably connected to the pivot wire 50 by any suitable means, such as a staple or bracket not shown. It will be understood that the trellis structure, including the high tension support structures 33 and the pivot wire 50 comprise a structure not dependent upon the stakes 48 for support, but operating entirely independently thereof. Thus, if a stake 48 is broken or otherwise damaged, i t can be removed and replaced without in any way compromising the strength of the trellis structure 30.

Each section 31 of the trellis structure 30 has several cross member assemblies 55. Each cross member assembly is mounted on a selected one of the stakes 48, as best shown in FIG. 1. Where the stakes are metal, the cross member assembly thereof can be secured by welding or using screws, not shown. Where the stakes are wood, the cross member assembly can be secured thereon by wood screws, not shown. Each cross member assembly has a central V-frame 56 defining an upwardly facing channel 57. Horizontal members 58 are mounted, as by welding, on the V-frame extending in opposite directions therefrom and aligned horizontally with each other. The horizontal members each have a plurality of wire holes 59 extending therethrough. In the preferred embodiment, each horizontal member has four such wire holes. A hook 60 is mounted, as by welding, on each horizontal member with the open portion 61 of the hook facing in the direction of the channel 57.

Figure 4:
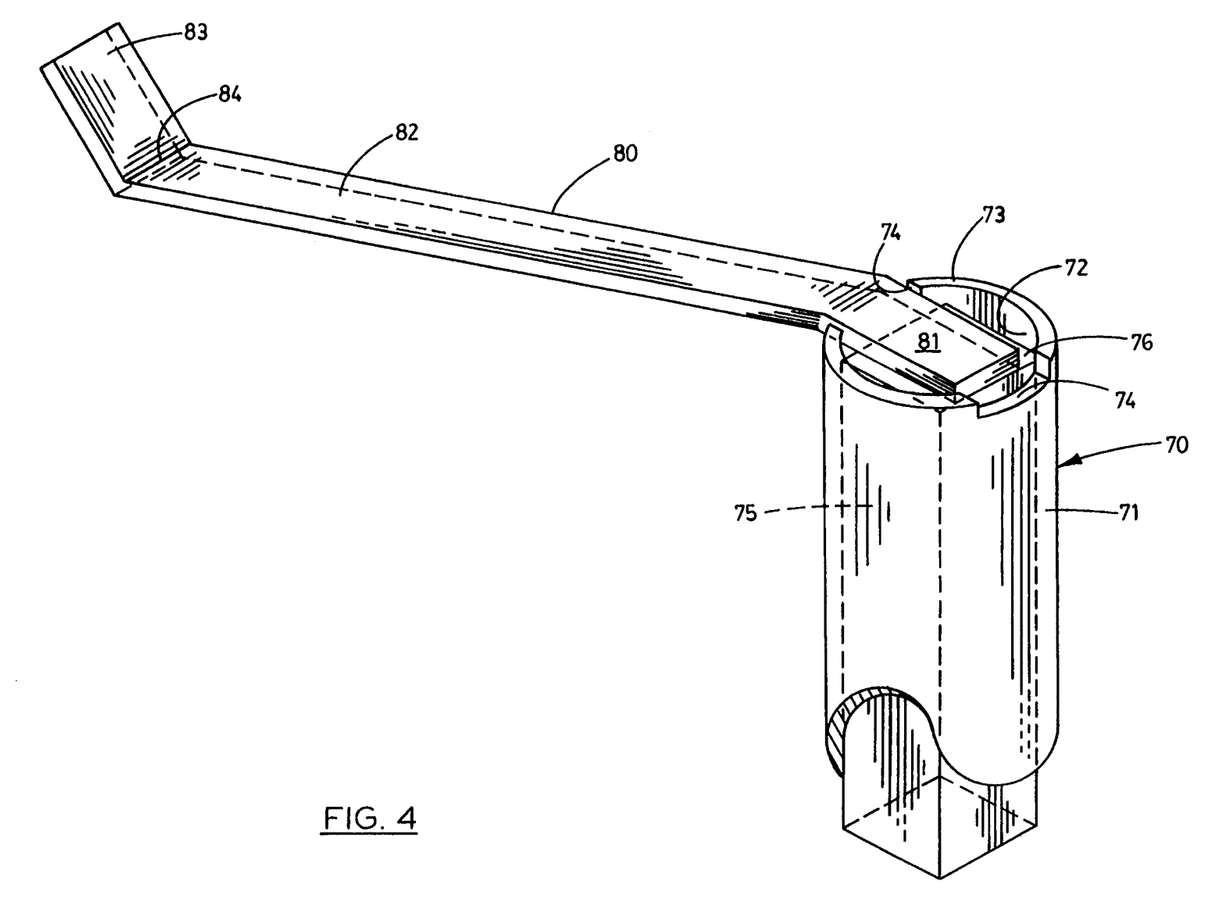
FIG. 4 is a still further enlarged, fragmentary perspective view of a control wire support assembly of the apparatus of the present invention.

Each section 31 of the trellis structure 30 preferably has a control wire support assembly 70 mounted at a suitable location therein so that the control wire support assemblies of the sections 31 are substantially equally spaced throughout the length of the row. Each support assembly includes an upright sleeve or pipe 71 mounted in the berm 21 in concrete, not shown. The pipe has a cylindrical interior 72 and an upper end portion 73. A pair of notches 74 are formed in the upper end portion of the pipe spaced 180 degrees from each other and aligned transversely of the row. A pivot member 75 is rotationally received in the interior 72 of the pipe 71 for pivotal movement therewithin. The pivot member is preferably a square tube which has corners in or near contact with the pipe so that the pivot member 75 is retained substantially in axial alignment with the pipe no matter in what pivotal position it is disposed within the pipe. The pivot member has an upper end 76.

A pivot wire support arm 80, having a mounted end portion 81, is affixed, as by welding, on the upper end 76 of the pivot member 75 at its mounted end portion 81. Each pivot arm has a downwardly sloped portion 82 and a distal upwardly bent portion 83. The sloped portion and bent portion thereby define an upwardly facing groove 84. As can best be seen in FIG. 2, the upper end portion 73 of the pipe 71 and thus the support arm 80 is spaced above the upper ends 49 of the stakes 48.

A control wire assembly 85 is mounted on the trellis structure 30. The control wire assembly includes a mounting bracket 86 slidably received on the rod 47 of the control wire mounting assembly 45. One such mounting bracket is slidably received on each of the rods 47 of the control wire mounting assemblies 45 at the opposite ends of the row. A control wire 87 is mounted on and extends between the mounting brackets. The control wire is under high tension extending therebetween, but the mounting brackets 86 are slidable along their respective control rods 47. Accordingly, the control wire is movable between a retracted position 88 received in the grooves 84 of the support arms 80 and a capturing position 89 received in the hooks 60, as will hereinafter be described.

The trellis structure 30 includes a multiplicity of trellis wires 95 mounted on the cross members 37 of the T-frames 34 and extending between the support structures 33 at the opposite ends of the row. The trellis wires 95 are under high tension and individually extend through the wire holes 59 of the horizontal member 58 of each cross member assembly 55.

Figure 3:
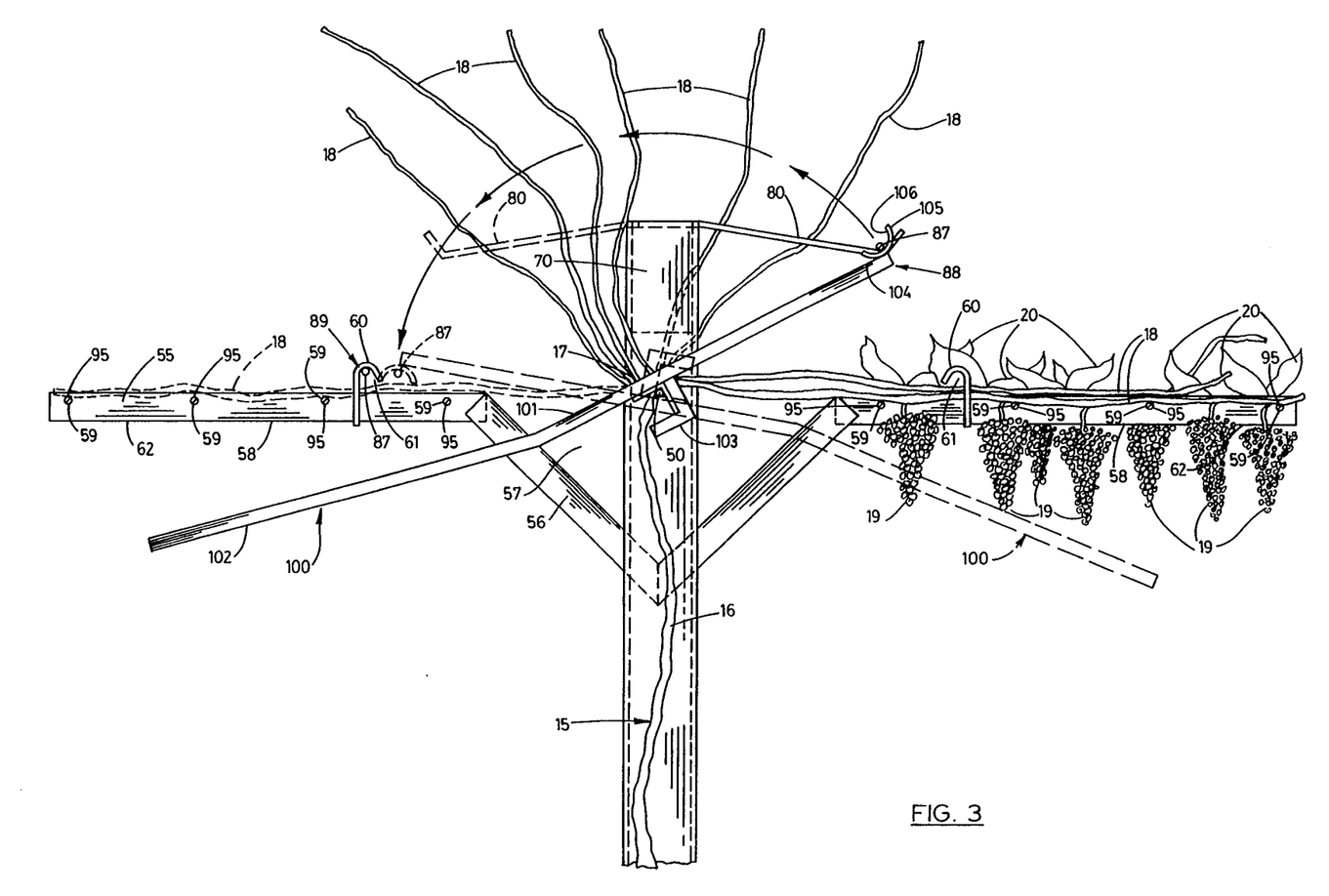
FIG. 3 is a somewhat further enlarged, fragmentary transverse vertical section taken on line 3—3 in FIG. 1.

As shown in FIG. 3, the apparatus 10 has a pivot member or tool 100 which is employed in moving the control wire 87 from the retracted position 88 to the capturing position 89 and in the reverse direction from the capturing position 89 to the retracted position 88. The tool has a body portion 101 on which is mounted a handle portion 102. A hook 103 is secured, as by welding, on the body portion and is operable for engagement with the pivot wire 50. The body portion 101 has a distal end portion 104. A wire contact member or plate 105 is secured, as by welding, on the distal end portion 104 and defines an arcuate receptacle 106.

For purposes which will subsequently become more clearly apparent, when the support portions 62 of adjacent rows of grapevines which extend toward each other over the path 14 begin bearing the crop, in accordance with the method and apparatus of the present invention the non crop bearing support portions of the same rows are individually connected to the non crop bearing support portions of the next adjacent rows by suitable wires, not shown. This acts as a counterbalance so that the crop bearing support portions are supported as the crop grows thereby assisting during harvest and the like. After these work operations are completed, the wires are removed.

OPERATION

The operation of the described embodiment of the present invention is believed to be readily apparent and is briefly summarized at this point.

The apparatus 10 is mounted in the earth as heretofore described, thereby forming the trellis structure 30 on which the grapevines 15 are supported and trained. While the grapevines can be trained on the trellis structure in a variety of different ways, for purposes of illustrative convenience, it will be understood as described herein that a grapevine is planted on each side of each stake 48 within their respective row. The trunk 16 of each grapevine is extended upwardly along its respective face of its respective stake, using suitable ties if necessary. The cordon 17 of each grapevine is then trained along the pivot wire 50 in a direction away from its respective stake. The cordons of the grapevines of adjacent stakes thus reach toward each other.

The canes 18 of a grapevine 15 grow from the cordon in random fashion and it is the canes that produce the crop, or bunches of grapes 19, as well as the foliage 20. However, it is known that the canes produced in a single growing season do not produce a crop typically until the next growing season. Therefore, the canes produced in one year must be left in place until the next season for a crop to be produced. Conversely, the canes which have once produced a crop should be removed by pruning to make room for the growth of canes in the next growing season. Thus, when such pruning takes place, the field workers must, in accordance with conventional plant culture, be extremely careful to prune away only the canes which have already produced a crop. In conventional horticultural practices, the canes are randomly positioned on the conventional trellis structure so that the distinction between the canes to be pruned away and the canes to be left in position is obscure. The method and apparatus of the present invention completely obviate this difficulty as well as possessing numerous other benefits.

Assuming, for purposes of illustrative convenience, that the description hereinafter to follow is to be with grapevines not having any canes 18 trained on the trellis structure 30, the control wire 87 must be first positioned in accordance with the method and apparatus of the present invention. This may best be visualized upon reference to FIG. 2. In accordance with the method and apparatus of the present invention, it is the objective to have the first and second rows of grapevines 12 and 13, respectively, produce crops, as shown in FIG. 2, on the support portions 62 thereof extending toward each other in the direction of the path 14 therebetween. For purposes of visualizing how the crop is produced in the manner shown in FIG. 2 it should be visualized that at this point there are no canes, foliage or bunches of grapes borne by the support portions. Rather only the trunk 16 and cordon 17 of each grapevine is supported in the trellis structure as previously described.

In order to dispose the apparatuses 10 of the respective first and second rows of grapevines 12 and 13 in the arrangement required for the practice of the method hereof, the support arms 80 of each row are lifted from their respective notches 74 of the control wire support assembly 70 and pivoted 180 degrees to the positions opposite to that shown in FIG. 2 and placed in the notches 74 available therefor. Thus, more specifically, the support arms 80, when properly positioned at this time, extend in the opposite directions to those shown in FIG. 2 and away from the path 14 between the first and second rows of grapevines. The control wire 87 of each apparatus is then positioned in the grooves 84 of the support arms of its respective row ,or, in other words, in the retracted positions 88 farthest from the support portions extending into path 14.

During the growing season, the cordons 17 of the grapevines 15 are permitted to grow the canes 18 in the natural, random fashion which can be visualized upon reference to FIG. 3. During the growing season, the control wire 87 of each apparatus 10 is then moved to the capturing position 89. Such movement can be accomplished using the tool 100. The hook 103 of the tool is positioned on the pivot wire 50 of the apparatus with the control wire received in the receptacle 106 of the plate 105, as best shown in FIG. 3. Grasping the handle portion 102, the tool is pivoted about the pivot wire from the position shown in full lines in FIG. 3 to the position shown in phantom lines in FIG. 3 wherein the plate 105 is directly in juxtaposition to the open portion 61 of the hook 60. The control wire is then simply slipped from the receptacle 106 through the open portions 61 for retention by the hooks 60. Such movement of the control wire along the entire length of the row, causes the control wire to engage the canes 18 and carry them from the randomly grown positions visualized in FIG. 3 to a position overlaying the support portion 62 of the trellis structure 30, as shown in phantom lines in FIG. 3. It has been found that the best time to move the control wire during the growing season is when the new canes are about 18 to 24 inches in length. At this length the canes are not so fragile as to be damaged by the control wire nor so strong as to make such movement of the control wire difficult. This would normally be in about May of the year.

Referring more particularly to FIG. 2, the canes 18 are thus positioned in overlaying relation to the support portions 62 of the first and second rows of grapevines 12 and 13, respectively, which extend toward each other in the direction of the path 14 between the rows. The control wires 87 of the respective apparatuses 10 of the rows are left in the capturing position 89 until sometime prior to the next growing season. The canes are thus held in the positions described.

Prior to the next growing season, the control wires 87 of the apparatuses 10 are moved to positions which constitute retracted positions 88 for purposes of positioning the canes to be trained on the support portions 62 of the trellis structures 30 on the opposite sides as shown in FIG. 2. For this purpose, the support arms 80 of the respective apparatuses are lifted and rotated 180 degrees to the positions shown in FIG. 2 and received in their respective notches 74 of their respective support assemblies 70. Manually, or using the tool 100, the control wire of each apparatus 10 is positioned in the grooves 84 of the support arms 80 of their respective apparatuses in the positions shown in FIG. 2. During the growing season, the canes 18 are permitted to grow from the cordons 17 of the grapevines 15 in the random manner previously described and as shown in FIG. 3. At the appropriate time during the growing season, previously described, the control wires 87 of the respective apparatuses are then moved, as previously described, using the tool 100 from the retracted positions 88 to the capturing positions 89 retained therein by the hooks 60. Such movement carries the canes to the positions overlaying the support portions 62 on the opposite sides of the respective rows of grapevines remote from the path 14 between the first and second rows of grapevines 12 and 13. The control wires are left in these positions until the appropriate time prior to the next growing season.

More or less simultaneously with the growth of the canes 18 described immediately above, the canes captured on the support portions 62 of the trellis structure 30 extending toward each other and in the direction of the path 14 produce the crop or bunches of grapes 19 as shown in FIG. 2. The crop is thereby disposed at substantially a common level and on adjoining sides of the path 14 for convenient harvest. As previously noted, the non crop bearing support portions of the first and second rows of grapevines 12 and 13 respectively are individually connected at this time to the non crop bearing support portions of their respective next adjacent rows by a plurality of wires to provide support to the trellis structures of rows 12 and 13. This acts to counterbalance the weight of the crop while leaving the path 14 open for the passage of tractors, mechanical harvesters and the like.

The method and apparatus of the present invention have particular utility in the vine drying of grapes to form raisins. This process conventionally calls for the canes 18 bearing the bunches of grapes 19 to be severed at a particular time prior to harvest so that dehydration of the grapes thereof takes place while the grapes are still on the vine. As can be visualized in FIGS. 2 and 3, such severing is easily accomplished by pruning the canes at the positions within the channels 57 defined by the V-frames 56 of the cross member assemblies 55. Since only canes bearing fruit are entrained on that side of the trellis structure, such pruning or severing can be accomplished with little or no training of field workers. Alternatively, mechanized pruning of the canes by passage through the channel is possible. At the proper time thereafter, the vine-dried raisins are available for harvest simply by passing along the path 14 between the first and second rows of grapevines 12 and 13 using field workers or mechanized harvesting equipment.

At the end of the growing season, whether the grapevines 15 were grown to produce grapes or dehydrated raisins, the canes on the adjacent support portions 62 are removed together with any foliage, and bunches of grapes or portions thereof remaining. Where the severing of the canes has been performed as previously described in the vine drying of grapes, such removal requires only physically pulling these portions of the grapevines from the adjacent support portions 62. Where no such vine drying of grapes has taken place, the canes 18 must be severed to permit such removal to take place.

In the subsequent or third growing season, the method heretofore described is repeated in that the canes 18 are permitted to grow in random fashion until the appropriate time during the growing season after which the control wires 87 of the respective apparatuses 10 are moved from the retracted positions 88 remote from the path 14 between the first and second rows of grapevines 12 and 13 to the capturing positions 89 to capture the canes on the support portions 62 of the trellis structures 30. Similarly, the canes which have been captured on the support portions of the trellis structures remote from the path 14 from the first and second rows of grapevines are permitted to produce the crop for harvest as previously described. It will be understood that each row is adjacent to another row which similarly has its crop entrained on the support portion of its trellis structure extending toward the support portion bearing the crop of that row. Thus, harvesting and other work operations are again facilitated by being performed on adjacent sides of adjoining rows in a single pass if desired.

The method and apparatus of the present invention are not only beneficial in the many respects heretofore set forth, but also make possible a host of operational advantages and capabilities. Since the crop is trained to grow substantially only in zones of predefined height and width and since the crops of adjoining rows are adjacent to each other, mechanical harvesting of the crop in single passes, using either conventional or mechanical harvesters hereafter to be invented therefor, is possible. Similarly, mechanized pruning of the canes during the growing season is possible in that a circular saw can be passed along each row traveling in the channel 57 defined by the V-frames 56 of the cross member assemblies 55 to sever all of the canes in a single pass. Since, as can thus be visualized in FIG. 2, the foliage 20 produced by the canes is substantially all above the support portion 62 of the trellis structure 30, shredding of this material can mechanically be achieved by passage of conventional shredding equipment above the support portion or by the use of mechanized equipment yet to be invented for this purpose.

Similarly, since the foliage 20 is largely above the support portions 62 and the crop largely suspended below the support portions, the crops are exposed to sunshine which assists in producing a higher grade crop. In the case of grapes, such exposure is known to produce a higher sugar content. In the production of raisins, vine-dried as previously described, the exposure of the grapes to sunlight hastens the drying process. Still further, rain occurring during the growing season is not entrapped in the foliage surrounding the grapes as in conventional systems, but is permitted to drain off and evaporate by the increased exposure to subsequent sunlight and air currents. Similarly, since the foliage, crop and canes are substantially contained within discrete zones, the spraying of any or all of these portions of the grapevines with, for example, insecticides, dehydration enhancers in the case of raisins, and the like can much more efficiently be accomplished. Since, as previously described, the crop producing canes are segregated from the renewal canes and pruning can be performed substantially without error, the crop production is maximized.

Therefore, the method and apparatus for plant culture of the present invention provide an extremely efficient and dependable means by which crops can be grown for mechanized treatment and handling with minimal manual labor, with little or no training of field workers, to produce a superior crop of maximum volume and in such a fashion as to lend itself to full mechanized farming of such plants, and having particular utility in application to the commercial farming of grapevines.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. An apparatus for plant culture wherein the plants grow elongated flexible portions each growing season, the apparatus comprising a frame adapted to be disposed adjacent to said plants and including an elongated trellis structure composed of a plurality of upright members mounted in the earth in upstanding relation, a plurality of cross members mounted on at least some of the upright members individual extending laterally thereof whereby said cross members define a pair of support portions projecting laterally of and on opposite sides of said upright members, a plurality of trellis wires interconnecting the cross members on common sides of the upright members within their respective support portions and a central member extending along the trellis structure substantially midway between said support portions; means for moving said flexible portions of the plants into positions overlaying said support portions of the frame extending laterally of the plants, said moving means including a capturing member mounted on the frame above the cross members for movement between a retracted position, spaced from the support position to which said flexible portions of the plants are to be moved on a side of the frame oppositely laterally disposed relative to said support portion, and a capturing position above and adjacent to said support portion whereby the capturing member can be moved from the retracted position to the capturing position to move said flexible portions of the plants into positions overlaying said support portion; securing members mounted on the cross members on opposite sides of the upright members fox selectively releasably retaining the capturing member in the capturing position above and adjacent to both support portions whereby the flexible potions of the plants can selectively be moved by the capturing member to positions overlaying the support portions of the frame; and a pivot member engageable with said central member, having one end portion engageable with said capturing member and an opposite handle portion adapted to be grasped to pivot the pivot member substantially about the central member to move the capturing member between said retracted and capturing positions.

2. The apparatus of claim 1 including an arm mounted on the frame engageable with said capturing member to support the capturing member in said retracted position.

3. The apparatus of claim 2 including means mounting said arm on the frame for movement between a position deployed to support the capturing member in the retracted position for one of said support portions of the frame and a position deployed to support the capturing member in the retracted position for the other of said support portions of the frame.

4. The apparatus of claim 3 wherein said mounting means includes an upright, substantially cylindrical sleeve having notches therein dimensioned to receive the arm in said positions and a member received in said sleeve for pivotal movement and having the arm mounted thereon for pivotal movement therewith for selected positioning in said notches.

5. The apparatus of claim 3 wherein said arm has a depression therein adapted to receive the capturing member therein to retain the capturing member in the retracted position.

6. The apparatus of claim 1 wherein said securing member is a hook, a pair of said hooks are mounted on each cross member facing the central member individually on the support portions of the frame and said end portion of the pivot member engageable with the capturing member has a receptacle for receiving the capturing member and said hooks, pivot member and central member are so positioned and dimensioned that the capturing member received in said receptacle can be moved to the capturing position in juxtaposition to the hook whereby the capturing member can be transferred from the receptacle of the pivot member to the hook for retention thereby in said capturing position.

7. The apparatus of claim 1 wherein said capturing member and control member are wires mounted on the frame so as to extend substantially longitudinally of the frame under high tension.

8. An apparatus for plant culture wherein the plants grow elongated flexible portions each growing season, the apparatus comprising a frame adapted to be disposed adjacent to said plants and including an elongated trellis structure composed of a plurality of upright members mounted in the earth in upstanding relation, a plurality of cross members mounted on at least some of the upright members individually extending laterally thereof whereby said cross members define a pair of support portions projecting laterally of and on opposite sides of said upright members, a plurality of trellis wires interconnecting the cross members on common sides of the upright members within their respective support portions and wherein said cross members have portions adjacent to their respective upright members extending downwardly to define a channel to permit said flexible portions to be severed when desired adjacent to the plants by passage of a cutting mechanism along the frame within the channel; and means for moving said flexible portions of the plants into positions overlaying said support portions of the frame extending laterally of the plants, said moving means including a capturing member mounted on the frame above the cross members for movement between a retracted position, spaced from the support portion to which said flexible portions of the plants are to be moved on a side of the frame oppositely laterally disposed relative to said support portion, and a capturing position above and adjacent to said support portion whereby the capturing member can be moved from the retracted position to the capturing position to move said flexible portions of the plants into positions overlaying said support portion; securing members mounted on the cross members on opposite sides of the upright members for selectively releasably retaining the capturing member in the capturing position above and adjacent to both support portions whereby the flexible portions of the plants can selectively be moved by the capturing member to positions overlaying the support portions of the frame.

9. An apparatus for plant culture wherein the plants grow elongated flexible portions each growing season, the apparatus comprising a plurality of flames adapted to be disposed adjacent to said plants and arranged in substantially parallel relation and including an elongated trellis structure composed of a plurality of upright members mounted in the earth in upstanding relation, a plurality of cross members mounted on at least some of the upright members individually extending laterally thereof whereby said cross members define a pair of support portions projecting laterally of and on opposite sides of said upright members, a plurality of trellis wires interconnecting the cross members on common sides of the upright members with their respective support portions and means for moving said flexible portions of the plants into positions overlaying said support portions of the frame extending laterally of the plants, said moving means including a capturing member mounted on the frame above the cross members for movement between a retracted position, spaced from the support portion to which said flexible portions of the plants are to be moved on a side of the frame oppositely laterally disposed relative to said support portion, and a capturing position above and adjacent to said support portion whereby the capturing member can be moved from the retracted position to the capturing position to move said flexible portions of the plants into positions overlaying said support portion; securing members mounted on the cross members on opposite sides of the upright members for selectively releasably retaining the capturing member in the capturing position above and adjacent to both support portions whereby the flexible portions of the plants can selectively be moved by the capturing member to positions overlaying the support portions of the frame; and wherein said flexible portions of the plants overlaying the support portions of the frames produce crops and including a plurality of wires for interconnecting the support portions which do not have flexible portions producing said crops individually with the support portions of the next adjacent substantially parallel flames to counterbalance the weight of said crops.

* * * * *

UNITED STATES PATENT AND TRADEMARK OFFICE
CERTIFICATE OF CORRECTION

PATENT NO. :     5,337,514

DATED      :     August 16, 1994

INVENTOR(S) :    Kazuo Hiyama, Howard K. Hiyama, Dean H. Hiyama

It is certified that error appears in the above-identified patent and that said Letters Patent is hereby corrected as shown below:

Column 2, line 46&47, delete "the full automation of such farming operations," and substitute ---increases the efficiency with which commercial---.

Column 3, line 66, delete "," between in and regard.

Column 5, line 25, delete "i t" and substitute ---it---.

Column 6, line 26, delete "member" and substitute ---members---.

Column 7, line 38, after Fig.2 insert ---,---.

Column 11, line 12, delete "fox" and substitute ---for---.

UNITED STATES PATENT AND TRADEMARK OFFICE
CERTIFICATE OF CORRECTION

PATENT NO. : 5,337,514
DATED : August 16, 1994
INVENTOR(S) : Kazuo Hiyama, Howard K. Hiymam, Dean H. Hiyama It is certified that error appears in the above-indentified patent and that said Letters Patent is hereby corrected as shown below:

Column 11, line 14, delete "potions" and substitute —portions—.

Signed and Sealed this

Twenty-fifth Day of October, 1994

Attest:

BRUCE LEHMAN

Attesting Officer    Commissioner of Patents and Trademarks